United States Patent [19]
Crumpacker et al.

[11] Patent Number: 5,863,481
[45] Date of Patent: Jan. 26, 1999

[54] PROCESS FOR FORMING A HIGH TEMPERATURE RESISTANT, FLEXIBLE, PLIABLE ELEMENTS CURABLE BY FALSE-MELT TECHNIQUE

[75] Inventors: Jill E. Crumpacker, Peoria; Kurt C. Kelley, Washington, both of Ill.

[73] Assignee: Caterpillar Inc., Peoria, Ill.

[21] Appl. No.: 956,511

[22] Filed: Oct. 23, 1997

[51] Int. Cl.⁶ .................................................. B29C 71/00
[52] U.S. Cl. ........................................... 264/234; 264/322
[58] Field of Search ..................................... 264/234, 322

[56] References Cited

U.S. PATENT DOCUMENTS

| 3,804,648 | 4/1974 | Birchall et al. | 106/85 |
| 5,415,824 | 5/1995 | Barrall et al. | 264/234 |
| 5,620,645 | 4/1997 | Crumpacker et al. | 264/234 |

FOREIGN PATENT DOCUMENTS 1261282  10/1989  Japan .

*Primary Examiner*—James Derrington
*Attorney, Agent, or Firm*—P. M. Khosla; Kevin M. Kercher

[57] ABSTRACT

A process for forming pliable elements curable by hot pressing to form high temperature resistant elements is disclosed. In this process, a metal, a metal compound, or a mixture thereof, which has some water of hydration, is mixed with orthophosphoric acid in an amount sufficient to form a resultant mixture having a pH value no greater than 0.85. A refractory material is added to the mixture and a resultant pliable curable material is formed. An element of a preselected configuration is formed from the pliable curable material. The element is dried at a temperature less than about 100° C. for a period of time sufficient to form a pliable curable element having a stable unitary mass. The pliable element is cured by "false melt" processing techniques.

13 Claims, No Drawings

PROCESS FOR FORMING A HIGH TEMPERATURE RESISTANT, FLEXIBLE, PLIABLE ELEMENTS CURABLE BY FALSE-MELT TECHNIQUE

TECHNICAL FIELD

The present invention relates to a process for forming high temperature resistant dense sealant/coating, and more particularly to a process for forming a flexible and pliable tape that can conform to complex geometrical shapes and is curable upon heating into a hard, dense, high temperature resistant sealant/coating by utilizing "false melt" processing techniques.

BACKGROUND ART

A process for forming elements for use in high temperature environments using the "false-melt" processing technique has been disclosed in U.S. Pat. No. 5,620,645, issued to Crumpacker et al. This process is useful for forming high temperature resistant elements by pre-heating and hot pressing "green" parts to within the "false-melt" range and then allowing the part to cure. However, these "green" parts are very hard and stiff in their dry uncured state and thus may not easily conform to complex geometrical shapes.

It has been very desirable to have an improved "false-melt" process to form "green" parts that, when dried, are soft and pliable, thus formable into a pliable tape or film, or pliable sheets. It has been desirable to form pliable sheets so that the sheet can be easily pressed to mimic complex geometrical shapes in a mold prior to pre-heating and hot pressing, without cracking such "green" parts.

The present invention is directed to overcome one or more of the problems as set forth above.

DISCLOSURE OF THE INVENTION

In one aspect of the invention, a process for forming pliable elements curable by hot pressing to form high temperature resistant elements is disclosed. In this process, a metal, a metal compound, or a mixture thereof, which has some water of hydration, is mixed with orthophosphoric acid in an amount sufficient to form a resultant mixture having a pH value no greater than 0.85. A refractory material is added to the mixture and a resultant pliable curable material is formed. The refractory material is added in an amount in the range of about 50% to about 95% by weight of the mixture. An element of a preselected configuration is formed from the pliable curable material. The element is dried at a temperature less than about 100° C. for a period of time sufficient to form a pliable curable element having a stable unitary mass. The element is subjected to a temperature within a range of a "false melt" temperature. Pressure is applied on the element while maintaining the element within the range of the "false melt" temperature to remove a portion of the water of hydration and cure the element to a preselected porosity.

BEST MODE FOR CARRYING OUT THE INVENTION

In the process of this invention, a metal, a metal compound, or a mixture thereof, which has some water of hydration, is mixed with orthophosphoric acid in an amount sufficient to form a resultant mixture having a pH value no greater than 0.85. It has been surprisingly found that if the pH value is purposely maintained equal to or less than 0.85, when the resultant mixture is mixed with the refractory material, a curable material is formed which remains flexible and pliable even after the initial drying at a temperature less than about 100 degrees C. It has also been surprisingly found that if the pH is allowed to exceed a value of 0.85, a relatively harder and non-pliable curable material is formed after the initial drying at a temperature less than about 100 degrees C. This is detrimental because a hard non-pliable material cannot be used as a tape. For the aforementioned reasons, it is desirable to maintain the pH no greater than 0.85. In one preferred embodiment of the present invention, the pH is desirably less than 0.85. Alternatively, in another preferred embodiment, the pH is desirably in the range of about 0.1 to about 0.6, and preferably in the range of about 0.2 to 0.5. In the best mode, the pH is about 0.5. A pH value less than 0.1 is also undesirable because it has been found that the resultant mixture, after drying, does not have adequate green strength.

A refractory material is then added to the mixture and a resultant pliable curable material is formed which has a dough-like consistency. The refractory material is added in an amount in the range of about 50% to about 95% of the resultant pliable curable material.

Refractory material in an amount less than about 50% is undesirable because it would result in excess binder which interferes with dense particular packing of the refractory material upon drying and later on, with the "false melt" forming, and detrimentally causes excessive shrinkage upon drying and undesirably low density of the finished product.

Refractory material in an amount greater than about 95% is undesirable because there is insufficient binder to fully fill the voids in the packed refractory material, which would result in an undesirably greater porosity and lower strength.

The molded element is thereafter dried at a temperature, desirably less than about 100 degrees C. and preferably less than about 70 degrees C. for a period of time sufficient to form a pliable curable element having a stable unitary mass when cooled to room temperature.

The temperature of the pliable non-hardened element is rapidly increased to a temperature in the range within the "false melt" temperature, in the range of about 130 degrees C. to about 200 degrees C., in which range, the element exhibits visible plastic properties, i.e., the element will harden with increasing temperature up to the "false melt" temperature range, and thereafter exhibit "false melt" plasticity during the "false melt" temperature range by softening up. Temperatures greater than the "false melt" temperature range are undesirable because the element will no longer exhibit the plastic behavior and will no longer be desirably densifiable.

Therefore, while maintaining the element at a temperature within the aforementioned range of the "false melt" temperature, pressure is applied on the element for densifying the element to a preselected porosity and deforming the element to preselected final dimensions.

It should be understood that by use of the term "false melt" it is meant a change in the material on heating to a specific temperature range where the material temporarily becomes plastic and mimics a melt. Unlike a true melt, which occurs at a higher temperature and where the composition of the material is unchanged, some material is lost during the "false melt".

It is believed that during the "false melt", sufficient energy has been introduced into the system to release the physically or chemically bound water of hydration that is not removed in its entirely during the initial lower temperature drying. The metal phosphate binder, still being partly hydrated with a portion of the water of hydration, is momentarily dissolved in the newly released water and the mixture softens sufficiently to become moldable. Above the "false melt temperature range, most of the water of hydration is lost from the material and the material hardens to a stable form. The "false melt" is not reversible so the material does not exhibit the same properties again. Because very little water is actually involved in the "false melt" processing, there is only a very minimal formation of porosity due to water loss.

The metal or metal compound that is utilized in this invention is one of aluminum hydroxide, aluminum, aluminum oxide, iron, nickel, copper, cupric oxide, silica, boron oxide, silver, chromium trioxide, magnesium oxide, zinc oxide and mixtures thereof, preferably a mixture of chromium trioxide and aluminum hydroxide, preferably in the range of about 10% to about 50% chromium trioxide and more preferably where the chromium trioxide is about 27% of said metal compound mixture. Alternatively, other metals, metal oxides and metal hydroxides can also be used, such as for example, oxides and hydroxides of zirconium, titanium, molybdenum, magnesium, and barium.

The refractory material added to the metal salt mixture is one of aluminum oxide, silicon nitride, mullite, zirconia and mixtures thereof, preferably aluminum oxide in an amount of about 70% by volume of said moldable material. Other refractory materials known in the art of plastic molding and ceramic processing as well as metal powders, and inorganic and organic fibers can be used.

In the process, the material is formed in the shape of a pliable curable tape which is has a stable unitary mass at a temperature less than about 100 degrees C., especially at room temperature. The tape is then placed in a die for exerting pressure thereon and "false melt" forming and subsequent curing.

An example of using this process to form pliable curable elements curable by hot pressing to form high temperature resistant articles, is as follows:

EXAMPLE A 5.8 grams of a $AlCrPO_4$ binder were mixed with 17.3 grams of $Al_2O_3$ to which 3.1 grams of acidified $H_2O$ was added with sufficient quantity of $H_3PO_4$ to result in a pH of 0.35. The resultant mixture had a slightly gel-like consistency and it was also thixotropic. The $Al_2O_3$ used was manufactured by Alcoa and sold under the trade name A-16 alumina.

The dough-like mixture, being thixotropic, would cease to "flow" after being left undisturbed for a small period of time. This mixture was cast into a tape and the tape was dried at 80 degrees C. to remove a portion of the water of hydration. The drying was stopped after the rate of weight loss was less than about 1 weight % per day. Then, the tape was ready for "false-melt" forming. It must be noted that drying times will vary depending on the amount of water lost from the mixture during mixing, the dimensions of the element being formed, and oven configuration, etc. After drying, the element (a tape in this Example) was very pliable and could be wound around an article intended to be shielded from high temperature and other harsh environments.

To form a high temperature resistant coating on an article, the article (with the tape wound around it) is heated to about 100 degrees C., and preferably, about 70 degrees C. at a rate of 10 degrees per minute and placed in a die (having an internal profile representative of the desired final external profile of the coated article) which is preheated to 200 degrees C. The die is immediately placed in a hot press preheated to 270 degrees C. and subjected to a pressure of about 50 $kg/cm^2$. The tape rapidly heats to within its "false-melt" temperature of about 130 degrees C. to 200 degrees C., and becoming temporarily plastic, decreases in thickness and reforms to the preselected internal profile of the die. The article coated with the tape is left in the die, under load, until it's temperature is greater than the upper end of the "false-melt" temperature range and the tape no longer exhibits plastic behavior, in about 5 minutes.

The article is ejected from the die and is resultingly coated with a high temperature resistant material that has a low porosity and precise dimensions controlled by the internal dimensions of the die. The high temperature tape can now withstand temperatures exceeding 1000 degrees C. without significant change in physical properties.

It must be understood that although the element described in the above Example is a tape, the present invention can be used to form elements with various configurations, such as pliable disks, pliable sheets etc., which are all encompassed within the claims of this invention.

INDUSTRIAL APPLICABILITY

The present invention can be used to make pliable sheets, tapes, disks and the like that can be used to coat articles having very intricate and complex shapes and surface. Because the "green", initially dried element is pliable and flexible, it can conform to the external shape of the article that it is intended to be coated onto. After hot pressing under pressure within the "false melt" range, the material becomes a high temperature resistant, high density coating. As an example, this process can be used to seal the surface of a piston in an internal combustion engine. The usefulness of this invention is truly appreciated when, say, the piston surface exposed to the combustion chamber has a very complex shape, for obtaining unique swirl patterns of the fuel etc., because the soft pliable tape or sheet can easily conform to the shape of the piston.

We claim:

1. A process for forming pliable elements curable by hot pressing to form high temperature resistant elements, comprising the steps of:

mixing one of a metal, metal compound, and mixtures thereof having water of hydration, with orthophosphoric acid, in an amount sufficient to form a resultant mixture having a pH value no greater than 0.85;

adding a refractory material to said mixture and forming a resultant pliable curable material, said refractory material being added in an amount in the range of about 50% to about 95% by weight of said mixture;

forming an element of a preselected configuration from said pliable curable material;

drying said element at a temperature less than about 100° C. for a period of time sufficient to form a pliable curable element having a stable unitary mass;

subjecting said element to a temperature within a range of a "false melt" temperature; and applying pressure on said element, while maintaining the element within the range of said "false melt" temperature, removing a portion of said water of hydration, and curing the element to a preselected porosity.

2. A process, as set forth in claim 1, wherein the pH value of the resultant mixture is less than 0.6.

3. A process, as set forth in claim 1, wherein the pH value of the resultant mixture is in the range of about 0.1 to about 0.6.

4. A process, as set forth in claim 3, wherein the pH value of the resultant mixture is in the range of about 0.2 to about 0.5.

5. A process, as set forth in claim 1, wherein the pH value of the resultant mixture is about 0.5.

6. A process, as set forth in claim 1, wherein the metal compound is one of aluminum hydroxide, chromium trioxide, magnesium oxide, zinc oxide and mixtures thereof.

7. A process, as set forth in claim 6, wherein the metal compound is a mixture of chromium trioxide and aluminum hydroxide.

8. A process, as set forth in claim 7, wherein the chromium trioxide of the mixture is in the range of about 10% to about 50%.

9. A process, as set forth in claim 8, wherein the chromium trioxide of the mixture is about 27% of said mixture.

10. A process, as set forth in claim 1, wherein the refractory material is one of aluminum hydroxide, silicon nitride, mullite, zirconia, and mixtures thereof.

11. A process, as set forth in claim 10, wherein the refractory material is aluminum oxide.

12. A process, as set forth in claim 1, including positioning the resultant pliable curable material in a die for exerting pressure thereon and forming an element of preselected configuration.

13. A process, as set forth in claim 1, wherein the element is dried into a stable unitary mass at a temperature less than about 70 degrees C.

* * * * *